United States Patent
Haber et al.

[11] Patent Number: 5,845,857
[45] Date of Patent: Dec. 8, 1998

[54] COFFEE MILL ADAPTED FOR CONTROLLED MIXING OF COFFEE BEANS

[75] Inventors: Barry M. Haber, Westport; Theodore B. Mullé, Ridgefield, both of Conn.; Asik Braginsky, Forest Hills, N.Y.

[73] Assignee: Conair Corporation, Stamford, Conn.

[21] Appl. No.: 920,260

[22] Filed: Aug. 22, 1997

Related U.S. Application Data

[62] Division of Ser. No. 491,706, Jun. 19, 1995, Pat. No. 5,697,528.

[51] Int. Cl.⁶ .................................................. B02C 19/12
[52] U.S. Cl. ........................... 241/81; 241/100; 241/222; 241/224; 241/225
[58] Field of Search ........................... 241/81, 100, 222, 241/224, 225, 101.6

[56] References Cited

U.S. PATENT DOCUMENTS

| | | | |
|---|---|---|---|
| 4,066,186 | 1/1978 | Agey | 222/48 |
| 4,789,106 | 12/1988 | Weber | 241/101.2 |
| 4,955,510 | 9/1990 | Newnan | 222/305 |
| 4,971,259 | 11/1990 | Nidiffer | 241/34 |
| 5,458,295 | 10/1995 | Haber et al. | 241/100 |
| 5,603,458 | 2/1997 | Sandolo | 241/34 |
| 5,690,283 | 11/1997 | Sandolo | 241/34 |
| 5,697,528 | 12/1997 | Haber et al. | 222/134 |

*Primary Examiner*—John M. Husar
*Attorney, Agent, or Firm*—Ohlandt, Greeley, Ruggiero & Perle

[57] ABSTRACT

A coffee mill providing for mixing of coffee beans in different ratios includes a bin partitioned in the middle to form two chambers holding two different types of coffee beans. An outlet in the bottom center of the bin leads to a coffee grinder. This central outlet is surrounded by a base cylinder having a side opening leading to each chamber of the bin. The cylinder is covered by a cylindrical closure cap, also partially open on the side. The cap can block both chambers of the bin, one chamber, or provide partial blocking to one side and none to the other, thus allowing the user to adjust the ratio of different coffee beans by rotating the cap. The bin interlocks with the housing of the grinder, but can be disengaged for removal. The cylindrical closure cap is positioned to block the outlet from both section of the bin when the bin is to be removed.

7 Claims, 6 Drawing Sheets

100% LEFT CHAMBER

75% LEFT
25% RIGHT

CLOSED 5,845,857

COFFEE MILL ADAPTED FOR CONTROLLED MIXING OF COFFEE BEANS

This is a divisional of application Ser. No. 08/491,706 filed on Jun. 19, 1995 now U.S. Pat. No. 5,697,528.

FIELD OF THE INVENTION

This invention relates to the field of coffee mills used for grinding coffee beans. In particular, it relates to a domestic coffee mill which can blend two different types of coffee beans in any desired proportions.

BACKGROUND OF THE INVENTION

Coffee grinders for use in the home often suffer from their inability to provide for the mixing of different types of coffee bean in desired ratios, and to provide for varying these ratios. Also, a problem can arise if one wishes to remove the bin of coffee beans, in order to clean the grinder blades, for the bin may not provide a closure to be used when the bin is to be removed. The present invention solves these problems by using a closure system which can both vary the coffee bean ratios and seal off the bin for removal.

Prior patents disclosing coffee mills include: Geerlings U.S. Pat. No. 3,182,919; and Nidiffer U.S. Pat. No. 4,971,259.

BRIEF SUMMARY OF THE INVENTION

Our coffee mill includes a bin partitioned in the middle to form two chambers which can hold two different types of coffee beans. An outlet in the bottom center of the bin leads to the inlet of a coffee grinder. This central outlet is surrounded by a closure system formed of a base cylinder having a side opening leading to each chamber of the bin, and by a cylindrical closure cap, also partially open on the side, which surrounds and covers the cylinder. The closure cap can block both chambers of the bin, only one chamber, or provide partial blocking to one chamber and none to the other, thus allowing the user to adjust the ratio of different coffee beans by rotating the cap. The bin interlocks with the housing of the grinder, but can be disengaged for removal. The cylindrical closure cap is positioned to block the outlet from both chambers of the bin when the bin is to be removed.

DETAILED DESCRIPTION OF THE INVENTION

Figure 1:
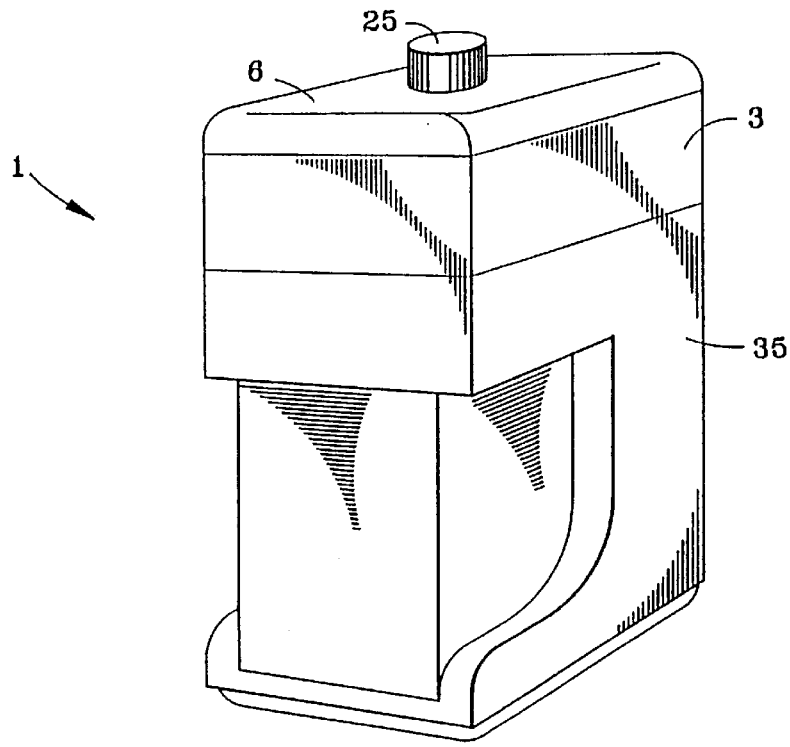
FIG. 1 is a perspective view of the coffee mill of our invention.

Our coffee mill 1 has a bin housing 3, with sides 5, top 6, and base 7. The surface of the base is angled downwardly toward the center of the base; and there is a central outlet opening 9 in the base. The base 7 has a ribbed surface with ribs 10, upon which the coffee beans rest.

A removable vertical partition 15 extends across the bin and divides it into left and right bean chambers 21 and 23, respectively. Opposite sides 5 carry partition receptors (mating slots) 11 and 13 to receive partition end members 17 and 19 and hold the partition in place. The partition member at one end of the partition is of a different width from the one at the other end; and the corresponding receptors are similarly sized. This prevents the partition from being placed in the bin facing in the wrong direction, adversely affecting the closure system 51. The direction of the partition is important since it carries a central opening 16 leading to shaft 27; and this carries one of the closure members. Shaft 27 runs to mixture control knob 25 (extending above top 6) so that knob 25 can be used to vary the blend of coffee beans.

Bin housing 3 is mounted on and above grinder housing 35 and fits on the grinder housing. The grinder housing 35 carries a grinder 37, with a grinder inlet opening 39 above it, and a grinder outlet opening 41 leading from the grinder. Grinder inlet opening 39 is located directly below bin outlet opening 9, to receive coffee beans passing through the opening 9, so that they can be ground.

Figure 2:
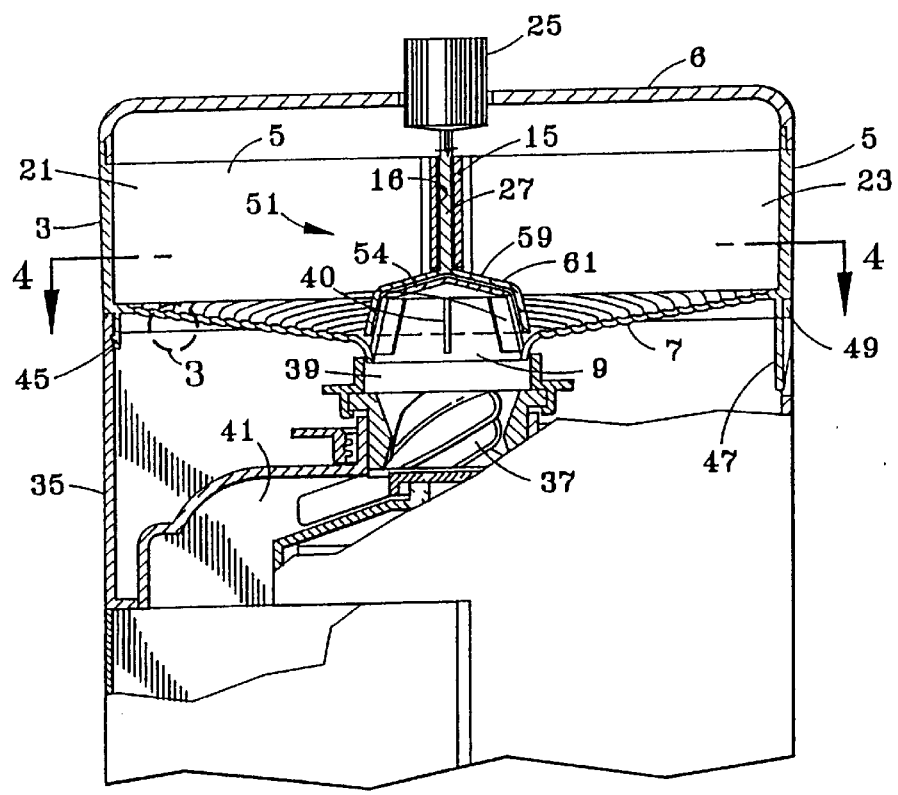
FIG. 2 is a side elevation, partially broken away in vertical section.
Figure 3:
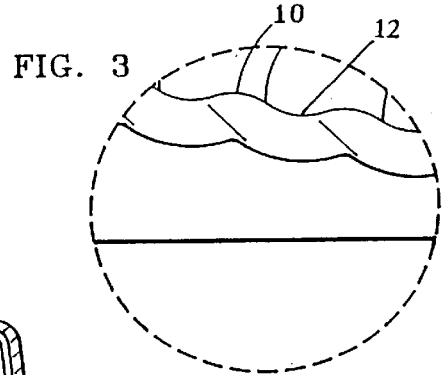
FIG. 3 is an enlarged portion of the floor of the bin, taken in the circle 3 of FIG. 2. It shows the ribbed surface of the floor.
Figure 11:
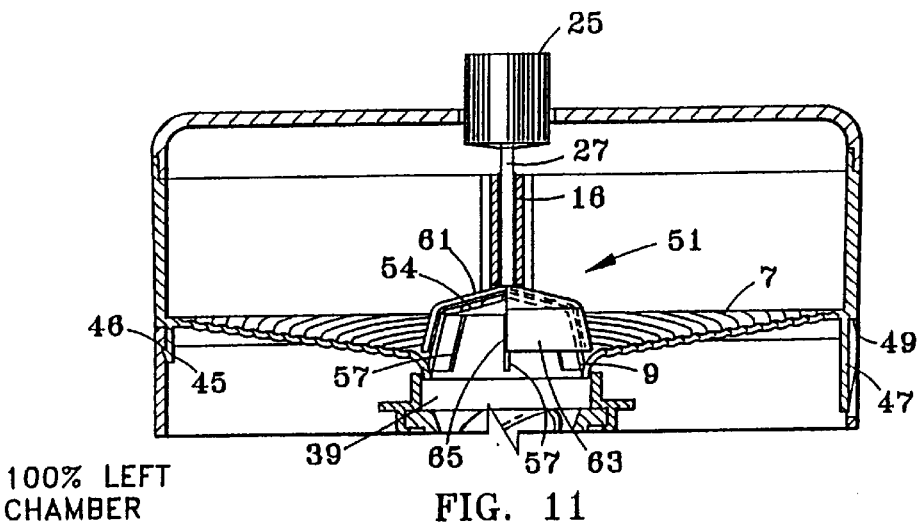
FIG. 11 shows the upper portion of FIG. 2, with the closure system set for 100% of the beans coming from the left chamber, and none from the right chamber.
Figure 12:
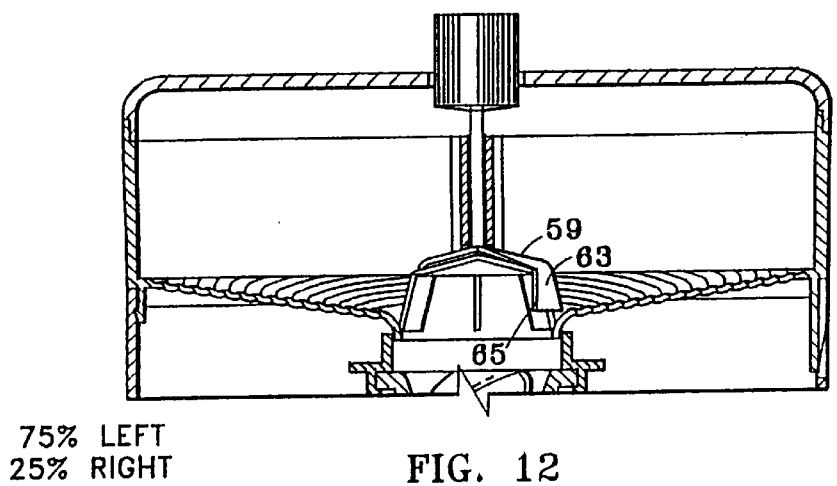
FIG. 12 is similar to FIG. 11, but with the closure system set for 75% of the beans coming from the left chamber, and 25% from the right chamber.
Figure 13:
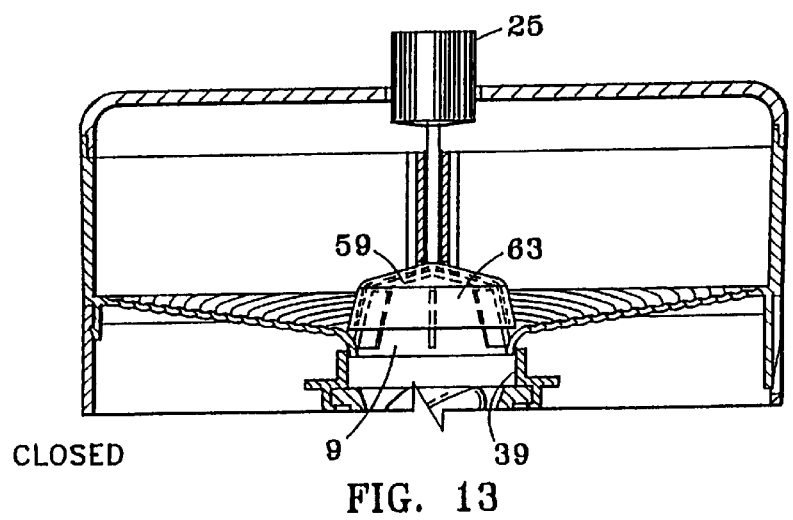
FIG. 13 is similar to FIG. 11, but with the closure system closed so none of the beans can leave the chambers.

Bin housing 3 is secured to grinder housing 35 by having locking hook 45 (on side 5) interengage with engaging hook 46 (on grinder housing 35) on one side of the unit, and release tab 49 (on housing 3) attached to engaging hole 47 (on housing 35) on this other side. These are best seen in FIGS. 2 and 11. Bin housing 3 is released from grinder housing 35 by pressing inwardly on release tab 47.

Figure 4:
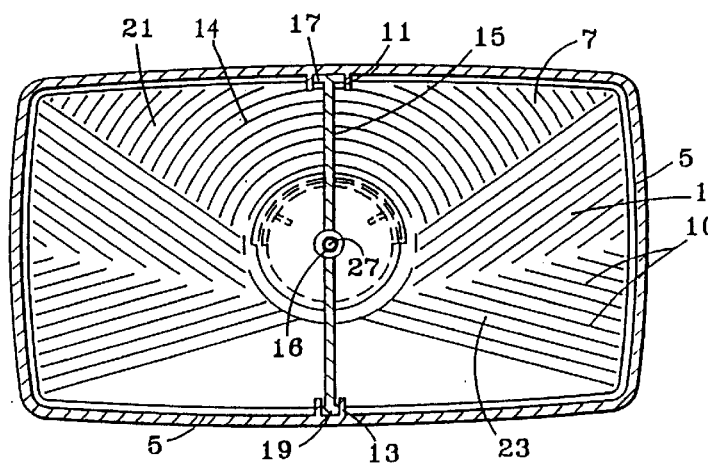
FIG. 4 is a horizontal section, taken on line 4—4 of FIG. 2, showing the ribbed surface of the floor of the bin. It also shows how the closure system is fitted into the bin, and how a dividing partition interlocks with the sides of the bin.
Figure 5:
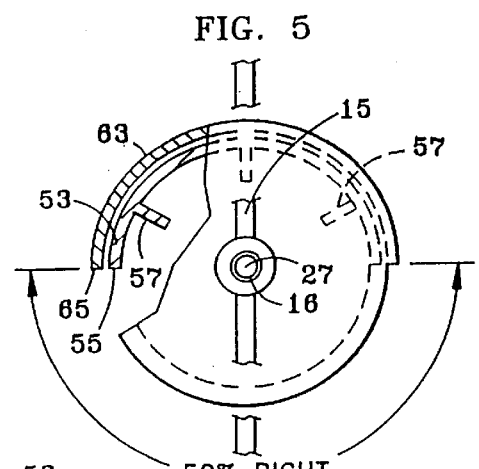
FIG. 5 is an enlargement of the central portion of FIG. 4, showing elements of the base cylinder and of the cylindrical closure cap and metering system.
Figure 6:
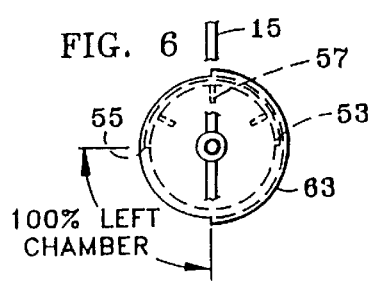
FIGS. 6 to 10 show the closure system of FIG. 5 in various positions. These are 100% left chamber; 100% right chamber; 75% right, 25% left; 75% left, 25% right; and fully closed, respectively.
Figure 7:
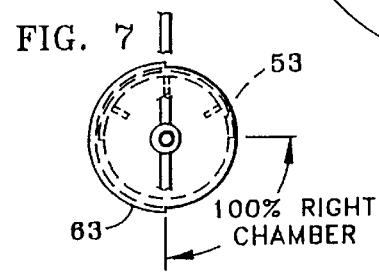
Figure 8:
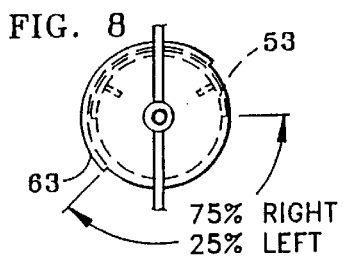
Figure 9:
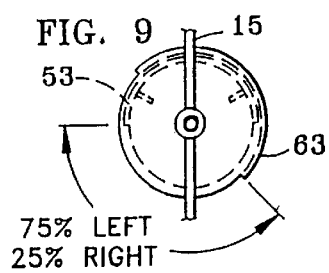
Figure 10:
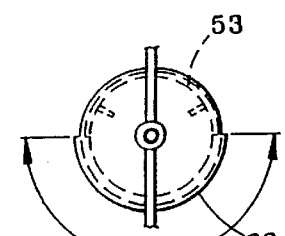
Figure 14:
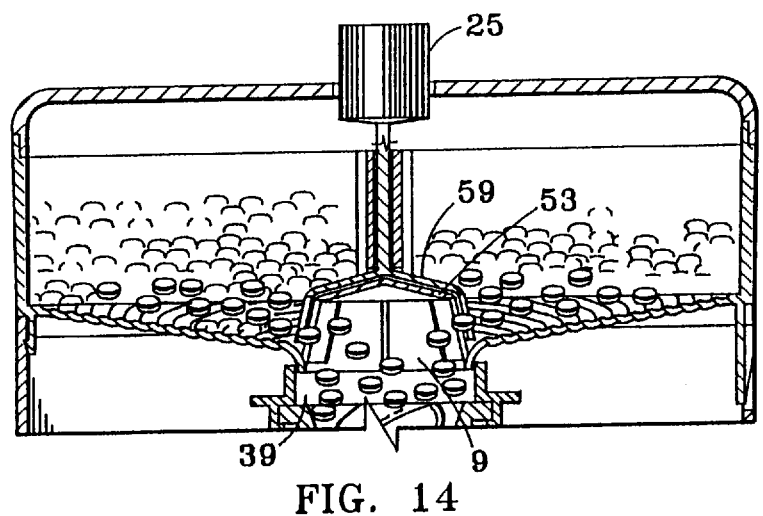
FIG. 14 is similar to FIG. 11, but also shows the beans flowing. Here the closure system is set so that half of the beans come from each chamber. It shows the interengagement of the bin with the housing.
Figure 16:
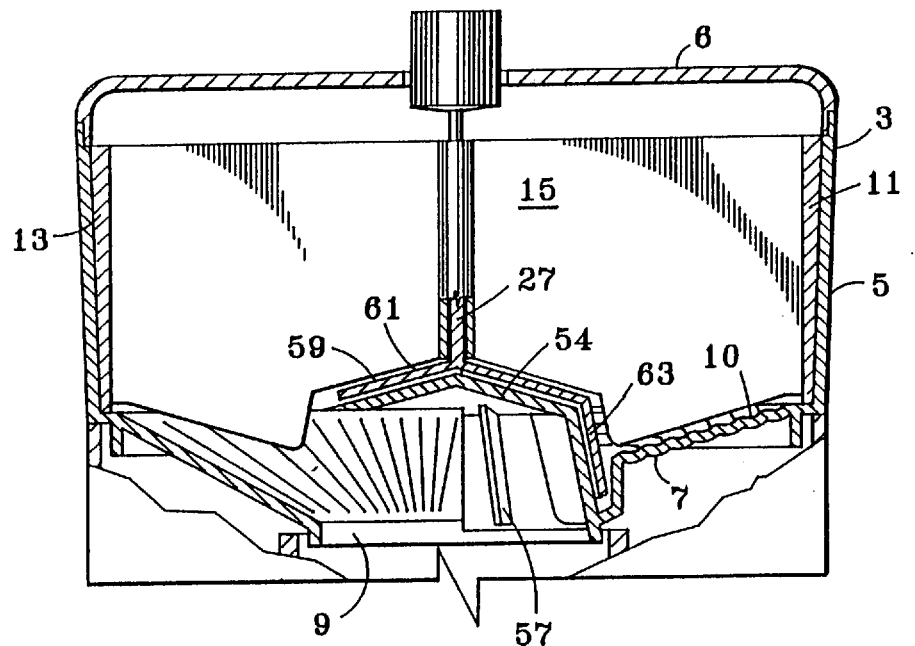
FIG. 16 is a vertical section, taken transversely to the section of FIG. 2, showing details of the bin partition and of the closure system.
Figure 17:
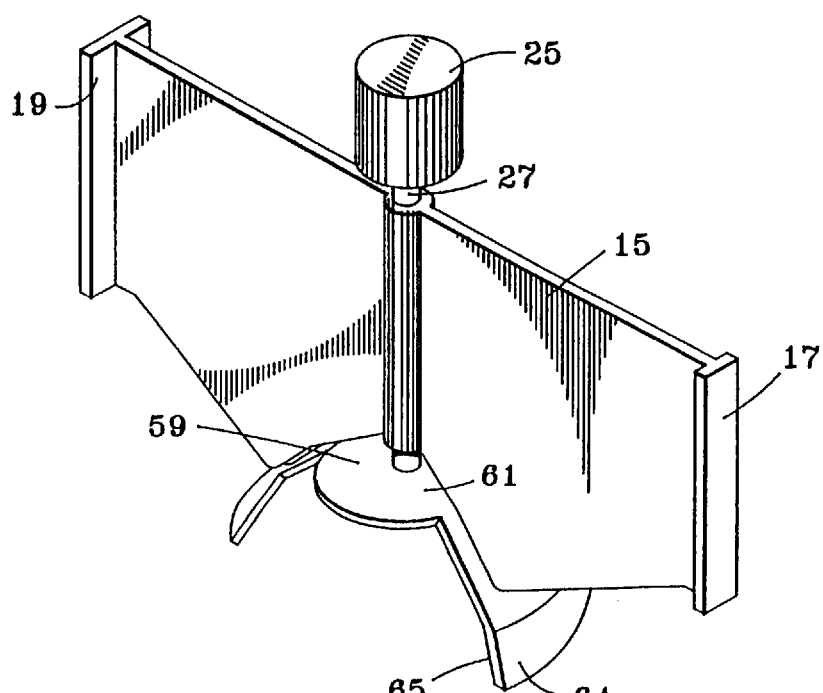
FIG. 17 is a perspective view of the bin partition, removed from the bin.
Figure 18:
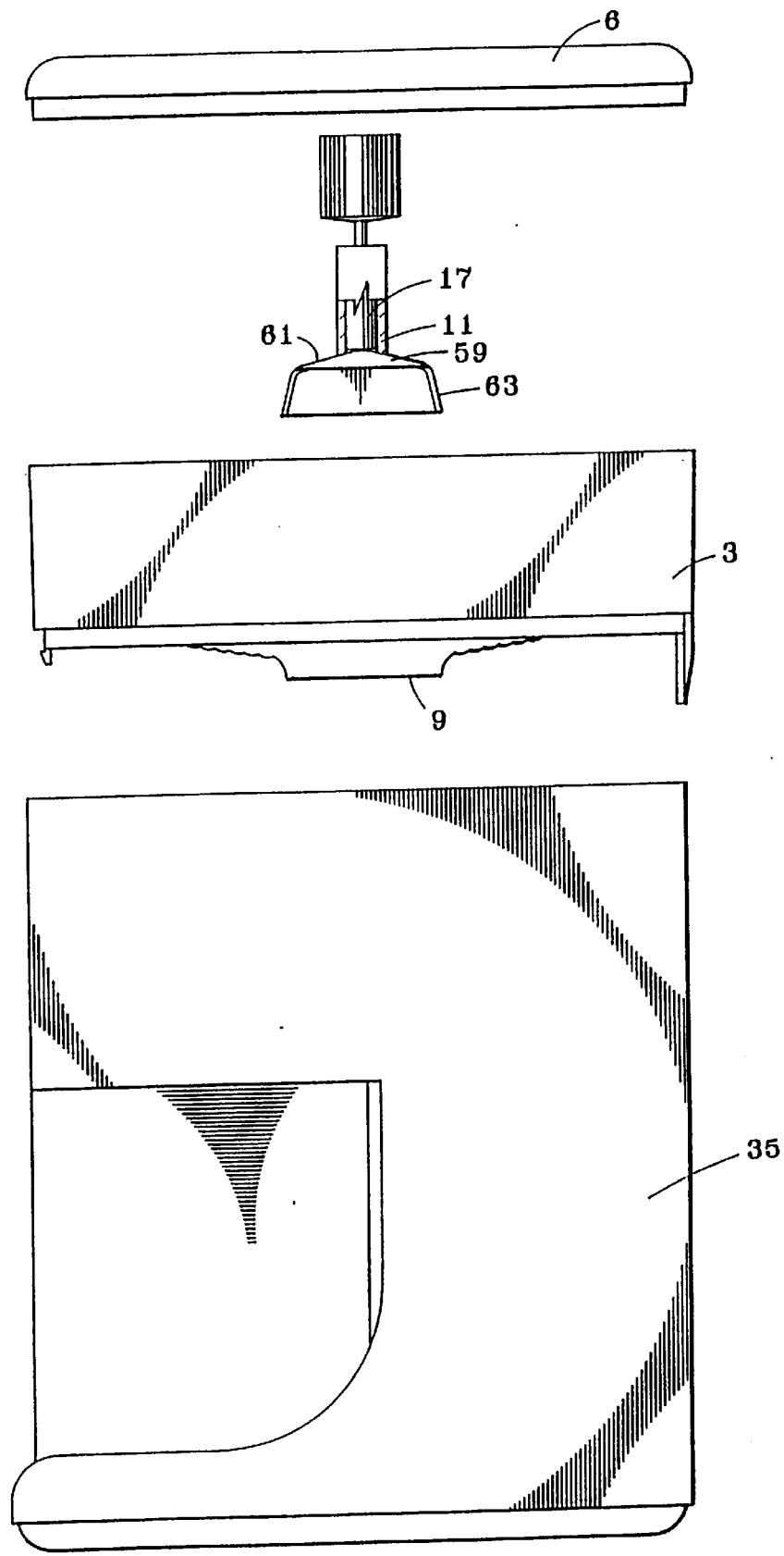
FIG. 18 is an exploded view of our coffee mill.

The closure system 51 for opening and closing bean outlet 9, and for varying the ratio of bean types can be seen in most of the figures. A base cylinder 53 with a closed top 54 and side opening 55 is mounted about and over outlet opening 9. Side opening 55 occupies most of half of the circumference of the cylinder 57. Cylinder 57 carries several control members or projections 53, radially directed, which serve to provide orderly flow to the coffee beans (See, especially, FIGS. 2, 4, and 16). Closure system 51 also includes a closure cap 59, made of a top 61 and a skirt 63. Skirt 63 fits about cylinder 53 and its top 54, and is carried by shaft 27 so that it can be rotated. Skirt 63 includes a side opening 65 which is preferably the same size as side opening 55. Thus, by rotating skirt 63, opening 65 can be made to overlap different parts of opening 55. The result is that varying proportions of beans from the two chambers 21 and 23 enter outlet opening 9 (FIG. 14) and pass to the grinder 37. As a result, mixtures can be varied all the way from 100% of one type and none of the other, to the reverse; and in one position of skirt 63, no flow is permitted. FIGS. 5 to 13 show various of these ratio positions, described above.

Figure 15:
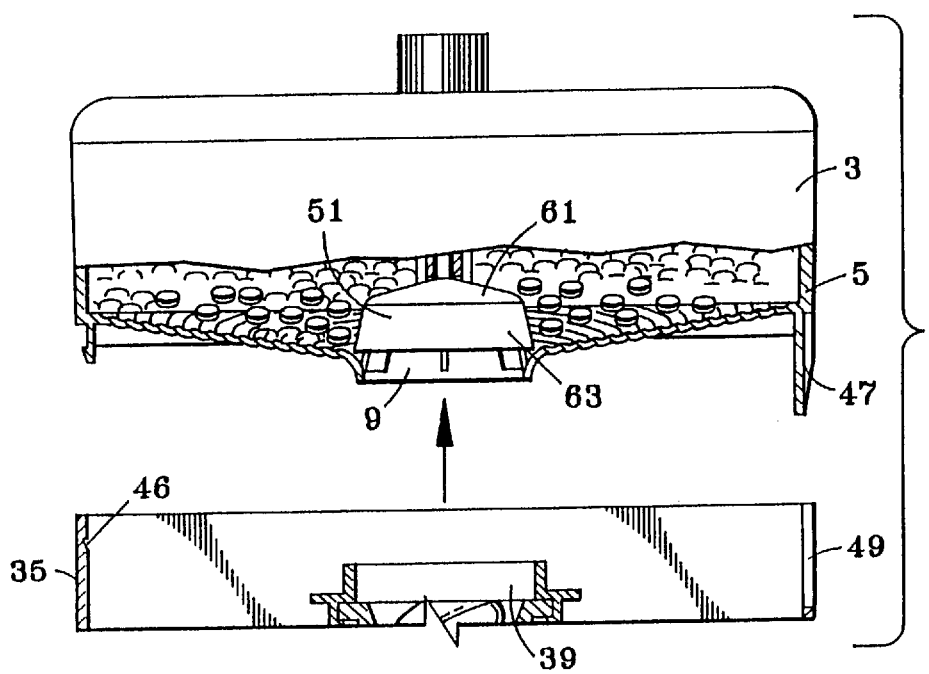
FIG. 15 is a front elevation, partially broken away, showing the bin removed from the grinder housing. The closure system is closed, so no beans can spill out.

FIG. 15 shows closure system 51 closed, with the bin housing 3 removed from the grinder housing 35. This permits easier cleaning without any of the beans spilling from the chambers.

The use of ribs 10, with intervening grooves 12, on the upper surface of base 7, serves to facilitate the flow of the coffee beans. The ribs are spaced a distance apart less than the diameter of the beans; this reduces surface contact and enhances the flow of the beans. The ribs have a polished surface, so as not to collect bean oil and so reduce cohesion of the base with the beans. To the rear the ribs have an arcuate shape 14; and at the sides, a herringbone shape 18. These features, together with the vibration created by the grinder 27, serve to direct the beans toward central outlet opening 9.

Accordingly, by use of our invention, a coffee mill is provided in which two different kinds of beans can be mixed, and the mixture ratio can be varied simply by rotating mixture control knob 25.

We claim:

1. A coffee mill for mixing and grinding coffee beans in different mixing ratios, said coffee mill including a grinder section, said grinder section including a grinder and a grinder inlet, a bin section mounted over said grinder section, said bin section having a base, two bean chambers, and a common outlet opening for said two chambers, said outlet opening leading to said grinder inlet, and a closure system positioned within said bean chambers and covering said common outlet opening, said closure system including metering means enabling a flow of beans from one bean chamber, from a second bean chamber or, concurrently, from both bean chambers, said closure system further enabling a variation of the ratio of beans from said two chambers passing through said common outlet opening.

2. A coffee mill as set forth in claim 1 in which said closure system includes (a) a base cylinder, said base cylinder having a top and a base cylinder side opening, said base cylinder being positioned about said common outlet opening to control bean flow therethrough, and (b) a cylindrical closure cap mounted for rotational movement around said base cylinder, said closure cap including a closure cap opening dimensioned so as to cover and uncover said base cylinder side opening in varying degrees as said cylindrical closure cap is rotated about said base cylinder.

3. A coffee mill as set forth in claim 1 including a removable partition in said bin serving to define said two bean chambers.

4. A coffee mill as set forth in claim 3 including means for mounting said partition in said bin in only one position.

5. A coffee mill as set forth in claim 2 including a removable partition in said bin serving to define said two bean chambers, and a shaft rotatably mounted in said partition and secured to said closure cap, whereby rotation of said shaft will rotate said closure cap.

6. A coffee mill as set forth in claim 1 including a plurality of ribs on said base, said ribs being patterned to direct coffee beans toward said common outlet opening.

7. A coffee mill as set forth in claim as set forth in claim 6 in which said ribs are spaced apart a distance less than the diameter of the coffee beans.

* * * * *